United States Patent
Jao et al.

(10) Patent No.: US 9,413,998 B2
(45) Date of Patent: Aug. 9, 2016

(54) IMAGE CAPTURING MODULE FOR INCREASING ASSEMBLY FLATNESS AND SHORTENING FOCUSING TIME AND METHOD OF ASSEMBLING THE SAME

(71) Applicant: LARVIEW TECHNOLOGIES CORP., Taoyuan County (TW)

(72) Inventors: Ching Lung Jao, Taipei (TW); Chiang Yuan Chuang, Taipei (TW); Yu Te Chou, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 87 days.

(21) Appl. No.: 14/324,279

(22) Filed: Jul. 7, 2014

(65) Prior Publication Data

US 2016/0006963 A1 Jan. 7, 2016

(51) Int. Cl.
*H04N 5/374* (2011.01)
*G03B 13/36* (2006.01)
*H04N 5/225* (2006.01)

(52) U.S. Cl.
CPC ............ *H04N 5/374* (2013.01); *G03B 13/36* (2013.01); *H04N 5/2252* (2013.01)

(58) Field of Classification Search
CPC ....... H04N 5/374; H04N 5/2252; G03B 13/36
See application file for complete search history.

(56) References Cited

U.S. PATENT DOCUMENTS

| | | | | |
|---|---|---|---|---|
| 2008/0084619 A1* | 4/2008 | Lee | ........................... | G02B 7/02 359/820 |
| 2008/0159595 A1* | 7/2008 | Park | ..................... | G01B 11/026 382/106 |
| 2009/0278978 A1* | 11/2009 | Suzuki | ..................... | G02B 7/08 348/345 |
| 2013/0050845 A1* | 2/2013 | Kwon | .................... | G02B 7/282 359/698 |
| 2015/0195449 A1* | 7/2015 | Ono | ......................... | G02B 7/36 348/349 |

* cited by examiner

*Primary Examiner* — Roberto Velez
*Assistant Examiner* — Tuan Le
(74) *Attorney, Agent, or Firm* — Li & Cai Intellectual Property (USA) Office (57) ABSTRACT

An image capturing module includes an image sensing unit, a housing frame, an actuator structure and a reflecting material. The image sensing unit includes an image sensing chip having a first horizontal top surface. The reflecting material is temporarily placed on the movable lens assembly of the actuator structure. The reflecting material has a second horizontal top surface. The distance from the laser light source to the first horizontal top surface is defined as a first horizontal distance, the distance from the laser light source to the second horizontal top surface is defined as a second horizontal distance, and a predetermined fixed focusing distance from the second horizontal top surface to the first horizontal top surface is obtained by subtracting the second horizontal distance from the first horizontal distance, for shortening the focusing time of the movable lens assembly relative to the image sensing chip.

10 Claims, 7 Drawing Sheets

IMAGE CAPTURING MODULE FOR INCREASING ASSEMBLY FLATNESS AND SHORTENING FOCUSING TIME AND METHOD OF ASSEMBLING THE SAME

BACKGROUND OF THE INVENTION

1. Field of the Invention

The instant disclosure relates to an image capturing module and a method of assembling the same, and more particularly to an image capturing module for increasing assembly flatness and shortening focusing time and a method of assembling the same.

2. Description of Related Art

Recently, it becomes more and more popular for portable devices such as mobile phones or PDA to be equipped with an imaging module. Furthermore, since the market requires these portable devices to have more powerful functions and smaller sizes, it is necessary for the imaging module to generate high quality pictures and to be of small size accordingly. One improvement of picture quality is to increase the number of pixel. The pixel number of an imaging module has already increased from the 300K (VGA) pixels to 2, 3 or even 8 million pixels, which is now common in the market. Another improvement lies in the definition of the image. Thus, the imaging module of a portable device also develops from a fixed-focus mode to auto-focus mode or even optical zoom mode.

The auto-focus mode employs the principle of moving the lens in the imaging module suitably according to various distances of targets, whereby the optical image of the desired target is focused correctly on an image sensor to generate a clear image. The common ways of activating the lens to move in the imaging module include activating by a stepping motor, piezoelectric motor and voice coil motor (VCM). However, both the image sensor and the sensor housing are disposed on the same datum plane of the circuit board, thus the assembly tilt angle of the sensor housing relative to the image sensor is increased to decrease the image quality provided by the imaging module. Besides, it is just very time consuming to manually focus the imaging module relative to the image sensor.

SUMMARY OF THE INVENTION

One aspect of the instant disclosure relates to an image capturing module for increasing assembly flatness and shortening focusing time and a method of assembling the same.

One of the embodiments of the instant disclosure provides an image capturing module for increasing assembly flatness and shortening focusing time, comprising: an image sensing unit, a housing frame, an actuator structure and a reflecting material. The image sensing unit includes a carrier substrate and an image sensing chip disposed on the carrier substrate and electrically connected to the carrier substrate, wherein the image sensing chip has a first horizontal top surface on the top side thereof, and the first horizontal top surface is obtained by a horizontal correction system using a laser light source. The housing frame is disposed on the carrier substrate to surround the image sensing chip. The actuator structure is disposed on the housing frame and above the image sensing chip, wherein the actuator structure includes a lens holder disposed on the housing frame and a movable lens assembly disposed inside the lens holder and above the image sensing chip, the lens holder includes a surrounding movable member movably disposed therein, the movable lens assembly is fixed inside the surrounding movable member through at least two separate bonding glue, and the movable lens assembly is movably disposed inside the lens holder through the surrounding movable member. The reflecting material is temporarily placed on the top side of the movable lens assembly, wherein the reflecting material has a second horizontal top surface on the top side thereof, and the second horizontal top surface is obtained by the horizontal correction system using the laser light source. Hence, the first horizontal top surface of the image sensing chip and the second horizontal top surface of the reflecting material are horizontal to each other, for increasing the assembly flatness of the movable lens assembly relative to the image sensing chip. Whereby, the distance from the laser light source to the first horizontal top surface of the image sensing chip is defined as a first vertical distance, the distance from the laser light source to the second horizontal top surface of the reflecting material is defined as a second vertical distance, and a predetermined fixed focusing distance from the second horizontal top surface of the reflecting material to the first horizontal top surface of the image sensing chip is obtained by subtracting the second vertical distance from the first vertical distance, for shortening the focusing time of the movable lens assembly relative to the image sensing chip.

Another one of the embodiments of the instant disclosure provides an image capturing module for increasing assembly flatness and shortening focusing time, comprising: an image sensing unit, a housing frame, an actuator structure and a reflecting material. The image sensing unit includes a carrier substrate and an image sensing chip disposed on the carrier substrate and electrically connected to the carrier substrate, wherein the image sensing chip has a first horizontal top surface on the top side thereof. The housing frame is disposed on the carrier substrate to surround the image sensing chip. The actuator structure is disposed on the housing frame and above the image sensing chip, wherein the actuator structure includes a lens holder disposed on the housing frame and a movable lens assembly movably disposed inside the lens holder and above the image sensing chip, and the movable lens assembly has a first plane on the top side thereof. The reflecting material is movably and temporarily placed on the first plane of the movable lens assembly, wherein the reflecting material has a second horizontal top surface on the top side thereof, the reflecting material has a second plane on the bottom side thereof and corresponding to the first plane, and the second plane is horizontal to the second horizontal top surface. Hence, the first horizontal top surface of the image sensing chip and the second horizontal top surface of the reflecting material are horizontal to each other, for increasing the assembly flatness of the movable lens assembly relative to the image sensing chip. Whereby, the distance from the laser light source to the first horizontal top surface of the image sensing chip is defined as a first vertical distance, the distance from the laser light source to the second horizontal top surface of the reflecting material is defined as a second vertical distance, and a predetermined fixed focusing distance from the second horizontal top surface of the reflecting material to the first horizontal top surface of the image sensing chip is obtained by subtracting the second vertical distance from the first vertical distance, for shortening the focusing time of the movable lens assembly relative to the image sensing chip.

Yet another one of the embodiments of the instant disclosure provides a method of assembling an image capturing module for increasing assembly flatness and shortening focusing time, comprising: providing an image sensing unit and a housing frame, wherein the image sensing unit includes a carrier substrate and an image sensing chip disposed on the carrier substrate and electrically connected to the carrier substrate, and the housing frame is disposed on the carrier substrate to surround the image sensing chip; obtaining a first horizontal top surface on the top side of the image sensing chip by a horizontal correction system using a laser light source, wherein the distance from the laser light source to the first horizontal top surface of the image sensing chip is defined as a first vertical distance; providing an actuator structure disposed on the housing frame and above the image sensing chip, wherein the actuator structure includes a lens holder disposed on the housing frame and a movable lens assembly disposed inside the lens holder and above the image sensing chip, and the lens holder includes a surrounding movable member movably disposed therein; temporarily placing a reflecting material on the top side of the movable lens assembly; obtaining a second horizontal top surface on the top side of the reflecting material by the horizontal correction system using the laser light source, wherein the distance from the laser light source to the second horizontal top surface of the reflecting material is defined as a second vertical distance, and the first horizontal top surface of the image sensing chip and the second horizontal top surface of the reflecting material are horizontal to each other, for increasing the assembly flatness of the movable lens assembly relative to the image sensing chip; adjusting the focal length of the movable lens assembly relative to the first horizontal top surface of the image sensing chip, so as to move the reflecting material upwardly and downwardly until the distance from the laser light source to the second horizontal top surface of the reflecting material is substantially equal to a preset value that is defined as the second vertical distance, wherein a predetermined fixed focusing distance from the second horizontal top surface of the reflecting material to the first horizontal top surface of the image sensing chip is obtained by subtracting the second vertical distance from the first vertical distance, for shortening the focusing time of the movable lens assembly relative to the image sensing chip; fixing the movable lens assembly inside the surrounding movable member through at least two separate bonding glue, wherein the movable lens assembly is movably disposed inside the lens holder through the surrounding movable member; and then removing the reflecting material from the top side of the movable lens assembly.

Therefore, the first horizontal top surface on the top side of the image sensing chip and the second horizontal top surface on the top side of the reflecting material can be obtained by the horizontal correction system using the same laser light source, thus when the second horizontal top surface of the reflecting material is horizontal to the first horizontal top surface of the image sensing chip, the assembly tilt angle of the movable lens assembly relative to the image sensing chip can be reduced for ensuring the flatness of the movable lens assembly relative to the image sensing chip. In addition, the predetermined fixed focusing distance from the second horizontal top surface of the reflecting material to the first horizontal top surface of the image sensing chip is easily obtained by subtracting the second vertical distance from the first vertical distance, thus the focusing time of the movable lens assembly relative to the image sensing chip can be shortened.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

The embodiments of "an image capturing module for increasing assembly flatness and shortening focusing time and a method of assembling the same" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Figure 1:
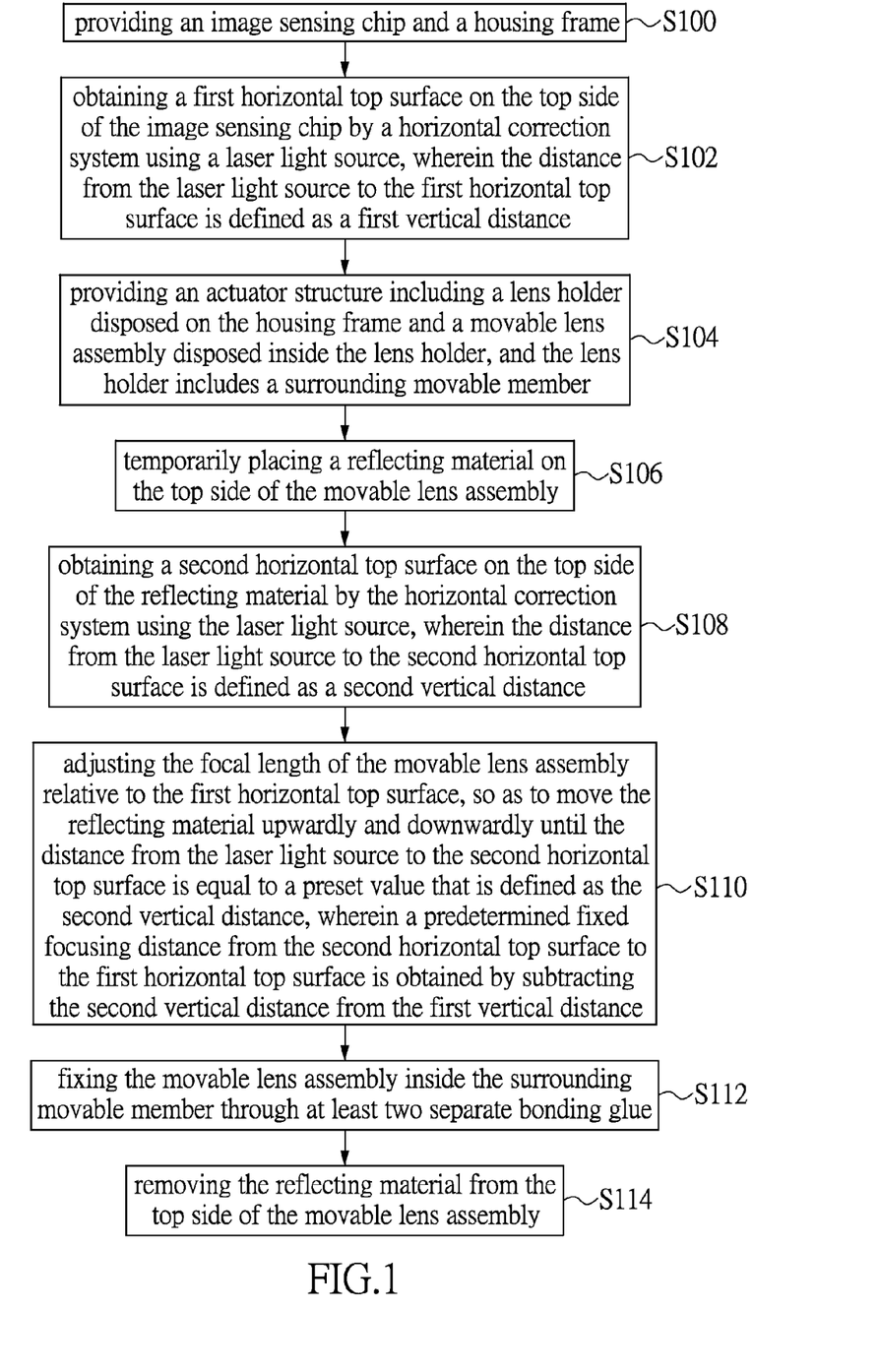
FIG. 1 shows a flowchart of the method of assembling an image capturing module for increasing assembly flatness and shortening focusing time according to the instant disclosure.
Figure 2:
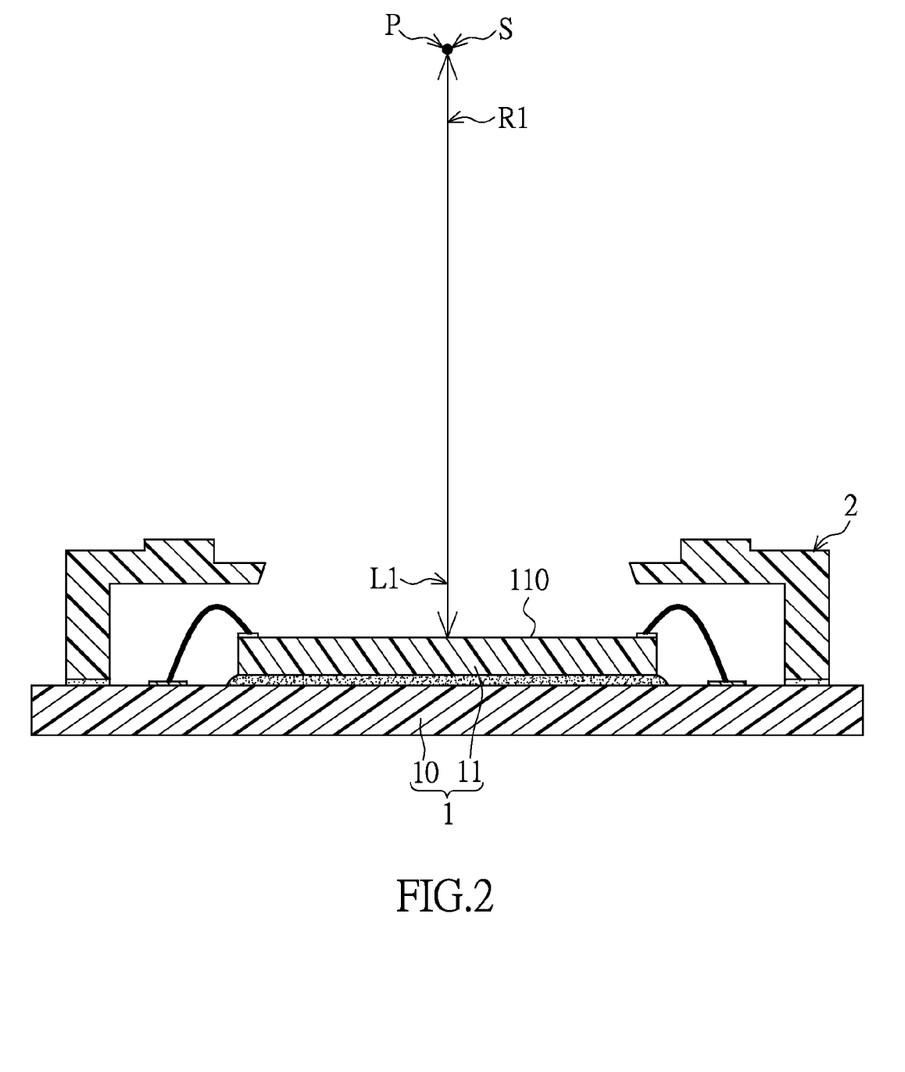
FIG. 2 shows a lateral, cross-sectional, schematic view of the assembly steps S100 and S102 of the method of assembling an image capturing module for increasing assembly flatness and shortening focusing time according to the instant disclosure.

Referring to FIG. 1 to FIG. 7, the instant disclosure provides a method of assembling an image capturing module M for increasing assembly flatness and shortening focusing time, comprising the following steps:

First, the step S100 is that: referring to FIG. 1 and FIG. 2, providing an image sensing unit 1 and a housing frame 2, wherein the image sensing unit 1 includes a carrier substrate 10 (or a carrying substrate) and an image sensing chip 11 disposed on the carrier substrate 10 and electrically connected to the carrier substrate 10, and the housing frame 2 is disposed on the carrier substrate 10 to surround the image sensing chip 11. For example, the image sensing chip 11 may be a CMOS (Complementary Metal-Oxide-Semiconductor) sensor, and the image sensing chip 11 can be adhesively disposed on the carrier substrate 10 through any type of adhesive material (not labeled), such as UV adhesive glue, thermosetting glue or curing glue. Moreover, the housing frame 2 can be adhesively disposed on the carrier substrate 10 through any type of adhesive material (not labeled), such as UV adhesive glue, thermosetting glue or curing glue. In addition, the carrier substrate 10 may be a circuit substrate having a plurality of conductive pads (not labeled) disposed on the top surface thereof, and the image sensing chip 11 has a plurality of conductive pads (not labeled) disposed on the top surface thereof. Each conductive pad (not labeled) of the image sensing chip 11 can be electrically connected to the corresponding conductive pad (not labeled) of the carrier substrate 10 through a corresponding conductive wire (not labeled), thus the image sensing chip 11 can be electrically connected with the carrier substrate 10 through the conductive wires (not labeled).

Figure 5:
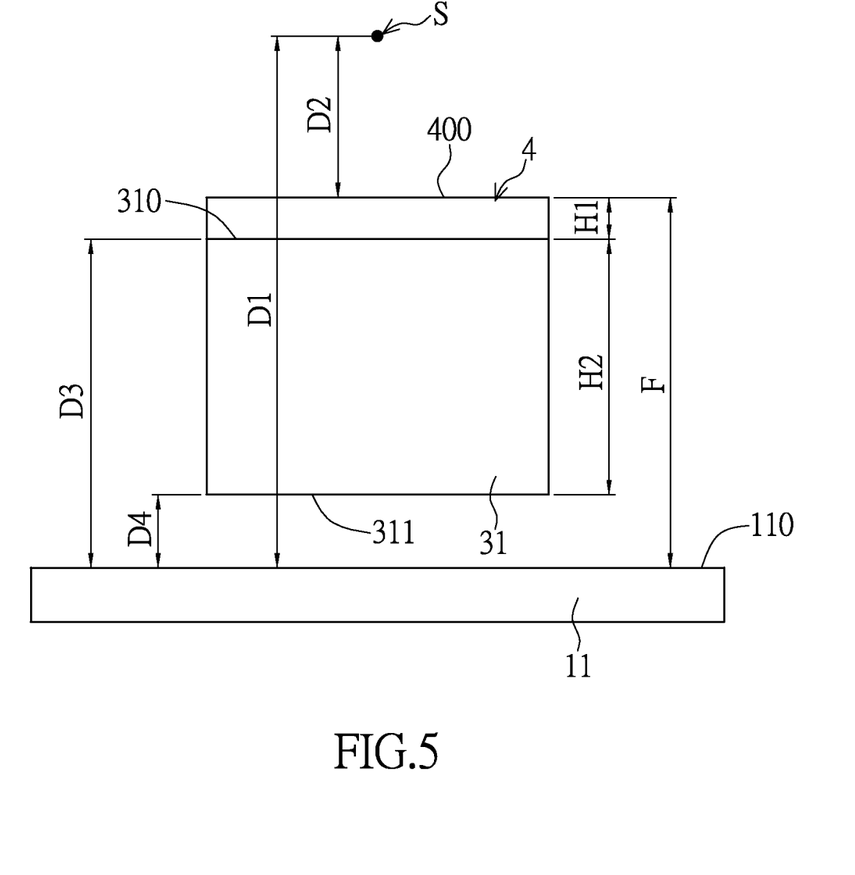
FIG. 5 shows a lateral, cross-sectional, schematic view of the assembly step S110 of the method of assembling an image capturing module for increasing assembly flatness and shortening focusing time according to the instant disclosure.

Next, the step S102 is that: referring to FIG. 1, FIG. 2 and FIG. 5, obtaining a first horizontal top surface 110 on the top side of the image sensing chip 11 by a horizontal correction system (such as a laser level) using a laser light source S, wherein the distance from the laser light source S to the first horizontal top surface 110 of the image sensing chip 11 is defined as a first vertical distance D1. More precisely, the laser light source S is disposed on a predetermined position P (such as a fixed position) above the image sensing chip 11 to generate a first laser light beam L1 that is directly and vertically projected onto the first horizontal top surface 110 of the image sensing chip 11, and the first laser light beam L1 generated by the laser light source S is reflected by the first horizontal top surface 110 of the image sensing chip 11 to form a first reflecting light beam R1 that is directly and vertically projected onto the predetermined position P or very close to the predetermined position P. In other words, when the image sensing chip 11 is adjusted to obtain a first horizontal top surface 110 on the top side of the image sensing chip 11, the first laser light beam L1 can be reflected by the first horizontal top surface 110 to form the first reflecting light beam R1 that is vertically returned to the predetermined position P, or the first reflecting light beam R1 is returned to near the predetermined position P due to the permissible error.

Figure 3:
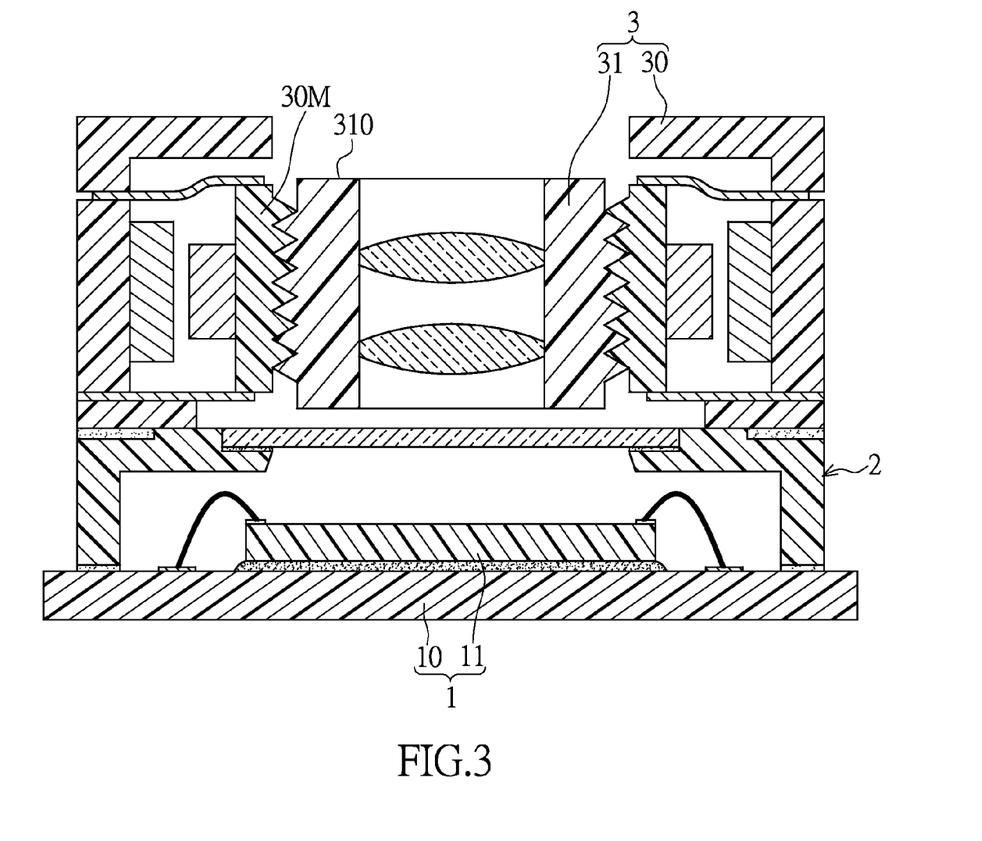
FIG. 3 shows a lateral, cross-sectional, schematic view of the assembly step S104 of the method of assembling an image capturing module for increasing assembly flatness and shortening focusing time according to the instant disclosure.

Then, the step S104 is that: referring to FIG. 1 and FIG. 3, providing an actuator structure 3 disposed on the housing frame 2 and above the image sensing chip 11, wherein the actuator structure 3 includes a lens holder 30 disposed on the housing frame 2 and a movable lens assembly 31 disposed inside the lens holder 30 and above the image sensing chip 11, and the lens holder 30 includes a surrounding (annular) movable member 30M movably disposed therein. For example, the lens holder 30 also can be adhesively disposed on the housing frame 2 through any type of adhesive material (not labeled), such as UV adhesive glue, thermosetting glue or curing glue, and the movable lens assembly 31 may be an optical lens group that is composed of a plurality of optical lenses (not labeled). In addition, it is worth mentioning that the actuator structure 3 may be a voice coil motor actuator, but the voice coil motor actuator used in the embodiment is merely an example and is not meant to limit the instant disclosure. For example, the actuator structure 3 can be replaced by an optical auxiliary structure having a fixed lens assembly.

Figure 4:
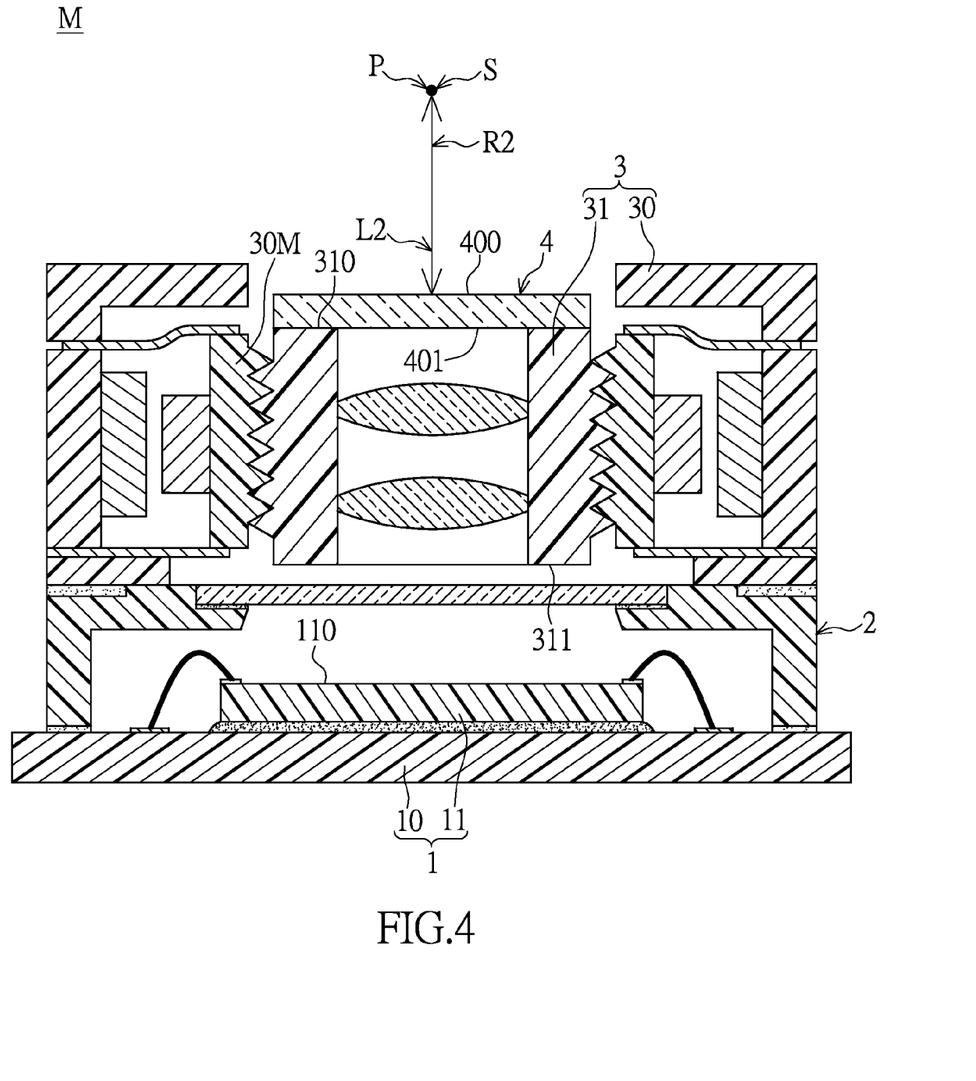
FIG. 4 shows a lateral, cross-sectional, schematic view of the assembly steps S106 and S108 of the method of assembling an image capturing module for increasing assembly flatness and shortening focusing time according to the instant disclosure.

Afterward, the step S106 is that: referring to FIG. 1, FIG. 3 and FIG. 4, temporarily placing a reflecting material 4 on the top side of the movable lens assembly 31. More precisely, the movable lens assembly 31 has a first plane 310 on the top side thereof, and the reflecting material 4 can be movably disposed on the first plane 310 of the movable lens assembly 31. For example, the reflecting material 4 may be one of a total-reflective substance (such as a reflecting mirror) and a semi-reflective substance (such as a glass), but it is merely an example and not meant to limit the instant disclosure.

Next, the step S108 is that: referring to FIG. 1 and FIG. 4, obtaining a second horizontal top surface 400 on the top side of the reflecting material 4 by the horizontal correction system using the laser light source S, wherein the distance from the laser light source S to the second horizontal top surface 400 of the reflecting material 4 is defined as a second vertical distance D2, and the first horizontal top surface 110 of the image sensing chip 11 and the second horizontal top surface 400 of the reflecting material 4 are horizontal to each other, for increasing the assembly flatness of the movable lens assembly 31 relative to the image sensing chip 11. In other words, because the second horizontal top surface 400 of the reflecting material 4 is horizontal to the first horizontal top surface 110 of the image sensing chip 11, the assembly tilt angle of the movable lens assembly 31 relative to the image sensing chip 11 is reduced for ensuring the flatness of the movable lens assembly 31 relative to the image sensing chip 11. In addition, the reflecting material 4 has a second plane 401 on the bottom side thereof and corresponding to the first plane 310, and the second plane 401 is horizontal to the second horizontal top surface 400.

More precisely, the laser light source S (such as a laser level) is disposed on a predetermined position P above the reflecting material 4 to generate a second laser light beam L2 that is directly and vertically projected onto the second horizontal top surface 400 of the reflecting material 4, and the second laser light beam L2 generated by the laser light source S is reflected by the second horizontal top surface 400 of the reflecting material 4 to form a second reflecting light beam R2 that is directly and vertically projected onto the predetermined position P or very close to the predetermined position P. In other words, when the reflecting material 4 is adjusted to obtain a second horizontal top surface 400 on the top side of the reflecting material 4, the second laser light beam L2 can be reflected by the second horizontal top surface 400 to form the second reflecting light beam R2 that is vertically returned to the predetermined position P, or the second reflecting light beam R2 is returned to near the predetermined position P due to the permissible error.

It is worth mentioning that the first laser light beam L1 generated by the laser light source S also can be inclinedly projected onto the first horizontal top surface 110 of the image sensing chip 11, and the second laser light beam L2 generated by the laser light source S also can be inclinedly projected onto the second horizontal top surface 400 of the reflecting material 4. If only the first reflecting light beam R1 and the second reflecting light beam R2 are projected onto the same position, the second horizontal top surface 400 of the reflecting material 4 also can be horizontal to the first horizontal top surface 110 of the image sensing chip 11, thus the assembly tilt angle of the movable lens assembly 31 relative to the image sensing chip 11 also can be reduced for ensuring the flatness of the movable lens assembly 31 relative to the image sensing chip 11.

Then, the step S110 is that: referring to FIG. 1, FIG. 4 and FIG. 5, adjusting the focal length of the movable lens assembly 31 relative to the first horizontal top surface 110 of the image sensing chip 11, so as to move the reflecting material 4 upwardly and downwardly until the distance from the laser light source S to the second horizontal top surface 400 of the reflecting material 4 is substantially or absolutely equal to a preset value that is defined as the second vertical distance D2 (as shown in FIG. 5), wherein a predetermined fixed focusing distance F from the second horizontal top surface 400 of the reflecting material 4 to the first horizontal top surface 110 of the image sensing chip 11 is obtained by subtracting the second vertical distance D2 from the first vertical distance D1, for shortening the focusing time of the movable lens assembly 31 relative to the image sensing chip 11. In other words, when the predetermined fixed focusing distance F is defined in advance by the user, and the first vertical distance D1 is obtained by the horizontal correction system using the laser light source S, the reflecting material 4 can be adjusted upwardly and downwardly until the distance from the laser light source S to the second horizontal top surface 400 of the reflecting material 4 is substantially or absolutely equal to the second vertical distance D2, thus the distance from the movable lens assembly 31 to the first horizontal top surface 110 of the image sensing chip 11 is certainty adjusted to a best focusing distance, so as to shorten the focusing time of the movable lens assembly 31 relative to the image sensing chip 11.

More precisely, referring to FIG. 4 and FIG. 5, the reflecting material 4 has a first predetermined thickness H1, and the movable lens assembly 31 has a second predetermined thickness H2. The distance from the first plane 310 of the movable lens assembly 31 to the first horizontal top surface 110 of the image sensing chip 11 is defined as a third vertical distance D3, and the distance from the bottom side 311 of the movable lens assembly 31 to the first horizontal top surface 110 of the image sensing chip 11 is defined as a fourth vertical distance D4. Whereby, both the third vertical distance D3 and the first predetermined thickness H1 add up to around the predetermined fixed focusing distance F, or all of the fourth vertical distance D4, the first predetermined thickness H1 and the second predetermined thickness H2 add up to around the predetermined fixed focusing distance F.

Figure 6:
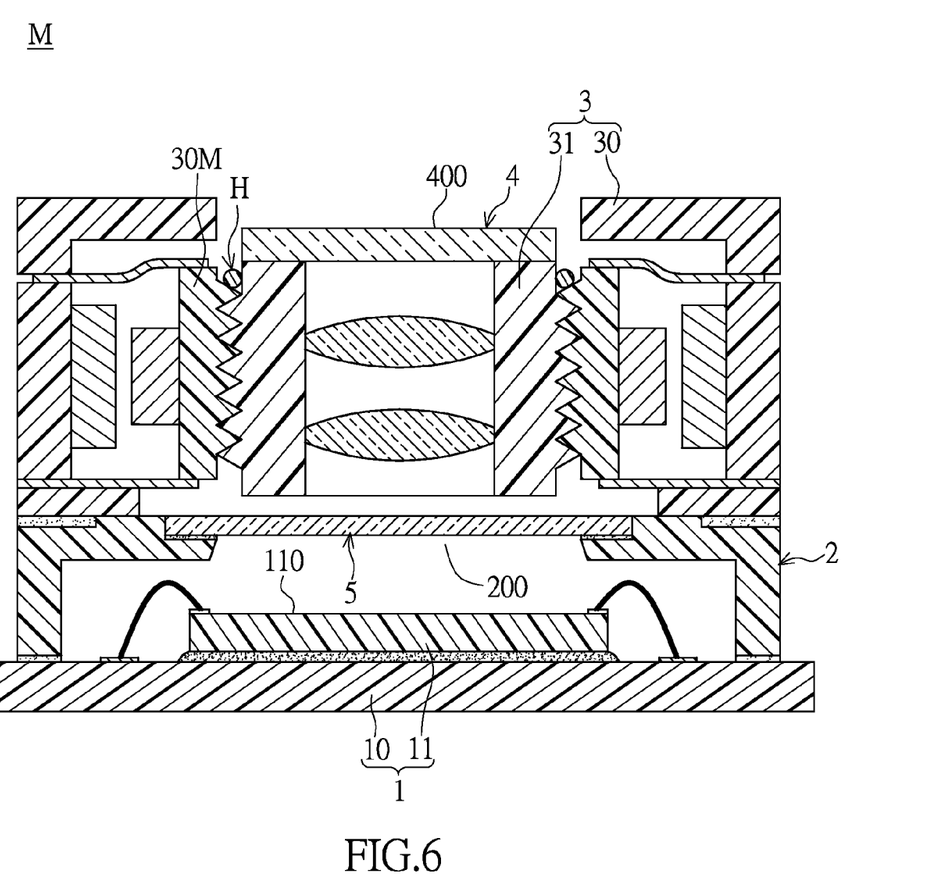
FIG. 6 shows a lateral, cross-sectional, schematic view of the assembly step S112 of the method of assembling an image capturing module for increasing assembly flatness and shortening focusing time according to the instant disclosure.

Afterward, the step S112 is that: referring to FIG. 1 and FIG. 6, when the second horizontal top surface 400 of the reflecting material 4 is horizontal to the first horizontal top surface 110 of the image sensing chip 11 and the distance from the laser light source S to the second horizontal top surface 400 of the reflecting material 4 is substantially or absolutely equal to the second vertical distance D2 by adjusting the movable lens assembly 31, the movable lens assembly 31 inside the surrounding movable member 30M can be fixed through at least two separate bonding glue H, wherein the movable lens assembly 31 is movably disposed inside the lens holder 30 through the surrounding movable member 30M.

Whereby, the instant disclosure provides an image capturing module M for increasing assembly flatness and shortening focusing time via the assembly steps from S100 to S112. The image capturing module M includes an image sensing unit 1, a housing frame 2, an actuator structure 3 and a reflecting material 4. The image sensing chip 11 has a first horizontal top surface 110 on the top side thereof, the reflecting material 4 has a second horizontal top surface 400 on the top side thereof, and the first horizontal top surface 110 and the second horizontal top surface 400 are obtained by a horizontal correction system using a laser light source S. Therefore, the first horizontal top surface 110 of the image sensing chip 11 and the second horizontal top surface 400 of the reflecting material 4 are horizontal to each other, for increasing the assembly flatness of the movable lens assembly 31 relative to the image sensing chip 11.

More precisely, when the distance from the laser light source S to the first horizontal top surface 110 of the image sensing chip 11 is defined as a first vertical distance D1 and the distance from the laser light source S to the second horizontal top surface 400 of the reflecting material 4 is defined as a second vertical distance D2, a predetermined fixed focusing distance F from the second horizontal top surface 400 of the reflecting material 4 to the first horizontal top surface 110 of the image sensing chip 11 is obtained by subtracting the second vertical distance D2 from the first vertical distance D1, for shortening the focusing time of the movable lens assembly 31 relative to the image sensing chip 11.

Furthermore, as shown in FIG. 6, the image capturing module M further comprises an optical filter 5 disposed on the housing frame 2 and between the image sensing chip 11 and the movable lens assembly 31. In addition, the housing frame 2 has a top opening 200 disposed on the top side thereof and between the image sensing chip 11 and the movable lens assembly 31, and the top opening 200 of the housing frame 2 is enclosed by the optical filter 5.

Figure 7:
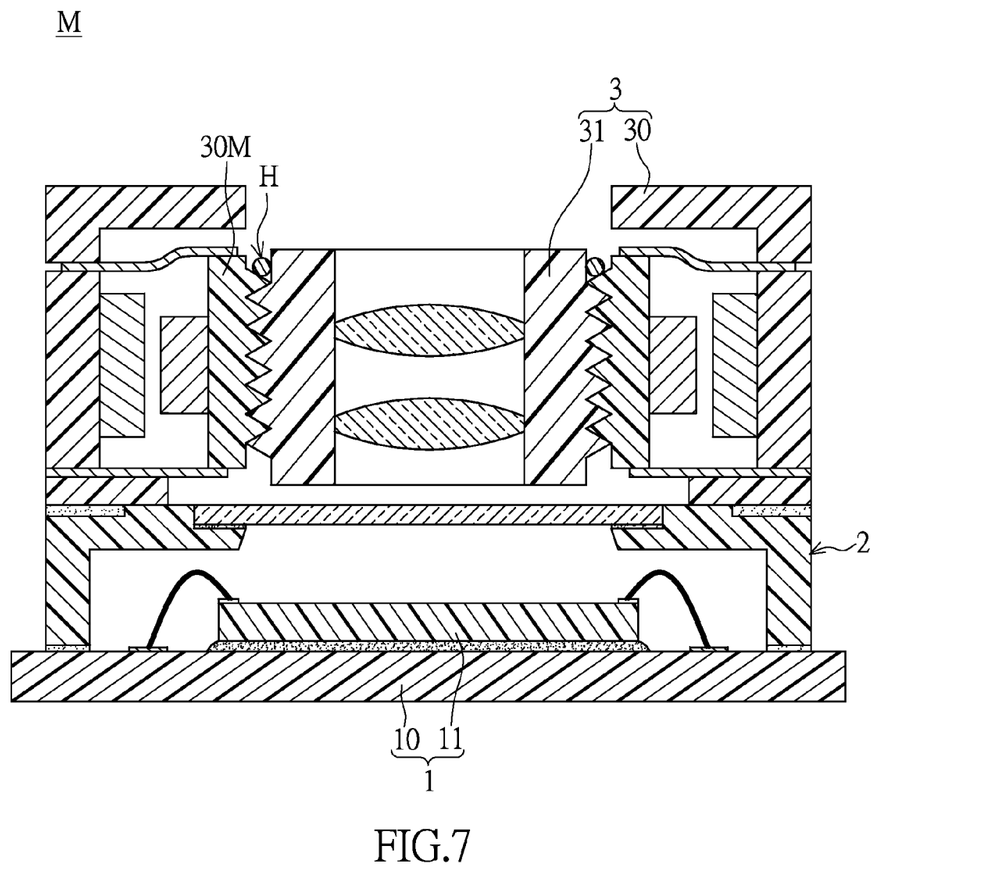
FIG. 7 shows a lateral, cross-sectional, schematic view of the assembly step S114 of the method of assembling an image capturing module for increasing assembly flatness and shortening focusing time according to the instant disclosure.

Finally, the step S114 is that: referring to FIG. 1, FIG. 6 and FIG. 7, removing the reflecting material 4 from the top side of the movable lens assembly 31.

In conclusion, the first horizontal top surface 110 on the top side of the image sensing chip 11 and the second horizontal top surface 400 on the top side of the reflecting material 4 can be obtained by the horizontal correction system using the same laser light source S, thus when the second horizontal top surface 400 of the reflecting material 4 is horizontal to the first horizontal top surface 110 of the image sensing chip 11, the assembly tilt angle of the movable lens assembly 31 relative to the image sensing chip 11 can be reduced for ensuring the flatness of the movable lens assembly 31 relative to the image sensing chip 11. In addition, the predetermined fixed focusing distance F from the second horizontal top surface 400 of the reflecting material 4 to the first horizontal top surface 110 of the image sensing chip 11 is easily obtained by subtracting the second vertical distance D2 from the first vertical distance D1, thus the focusing time of the movable lens assembly 31 relative to the image sensing chip 11 can be shortened.

The aforementioned descriptions merely represent the preferred embodiments of the instant disclosure, without any intention to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. An image capturing module for increasing assembly flatness and shortening focusing time, comprising:
    an image sensing unit including a carrier substrate and an image sensing chip disposed on the carrier substrate and electrically connected to the carrier substrate, wherein the image sensing chip has a first horizontal top surface on the top side thereof, and the first horizontal top surface is obtained by a horizontal correction system using a laser light source;
    a housing frame disposed on the carrier substrate to surround the image sensing chip;
    an actuator structure disposed on the housing frame and above the image sensing chip, wherein the actuator structure includes a lens holder disposed on the housing frame and a movable lens assembly disposed inside the lens holder and above the image sensing chip, the lens holder includes a surrounding movable member movably disposed therein, the movable lens assembly is fixed inside the surrounding movable member through at least two separate bonding glue, and the movable lens assembly is movably disposed inside the lens holder through the surrounding movable member; and
    a reflecting material temporarily placed on the top side of the movable lens assembly, wherein the reflecting material has a second horizontal top surface on the top side thereof, and the second horizontal top surface is obtained by the horizontal correction system using the laser light source;

wherein the first horizontal top surface of the image sensing chip and the second horizontal top surface of the reflecting material are horizontal to each other, for increasing the assembly flatness of the movable lens assembly relative to the image sensing chip;

wherein the distance from the laser light source to the first horizontal top surface of the image sensing chip is defined as a first vertical distance, the distance from the laser light source to the second horizontal top surface of the reflecting material is defined as a second vertical distance, and a predetermined fixed focusing distance from the second horizontal top surface of the reflecting material to the first horizontal top surface of the image sensing chip is obtained by subtracting the second vertical distance from the first vertical distance, for shortening the focusing time of the movable lens assembly relative to the image sensing chip.

2. The image capturing module of claim 1, wherein the movable lens assembly has a first plane on the top side thereof, the reflecting material has a second plane on the bottom side thereof and corresponding to the first plane, and the second plane is horizontal to the second horizontal top surface, wherein the reflecting material is movably disposed on the first plane of the movable lens assembly, and the reflecting material is one of a total-reflective substance and a semi-reflective substance.

3. The image capturing module of claim 2, wherein the reflecting material has a first predetermined thickness, the movable lens assembly has a second predetermined thickness, the distance from the first plane of the movable lens assembly to the first horizontal top surface of the image sensing chip is defined as a third vertical distance, the distance from the bottom side of the movable lens assembly to the first horizontal top surface of the image sensing chip is defined as a fourth vertical distance, and both the third vertical distance and the first predetermined distance or all of the fourth vertical distance, the first predetermined distance and the second predetermined distance add up to around the predetermined fixed focusing distance.

4. The image capturing module of claim 1, wherein the laser light source is disposed on a predetermined position above the image sensing chip to generate a first laser light beam that is directly projected onto the first horizontal top surface of the image sensing chip, and the first laser light beam generated by the laser light source is reflected by the first horizontal top surface of the image sensing chip to form a first reflecting light beam that is directly projected onto the predetermined position or very close to the predetermined position.

5. The image capturing module of claim 1, wherein the laser light source is disposed on a predetermined position above the reflecting material to generate a second laser light beam that is directly projected onto the second horizontal top surface of the reflecting material, and the second laser light beam generated by the laser light source is reflected by the second horizontal top surface of the reflecting material to form a second reflecting light beam that is directly projected onto the predetermined position or very close to the predetermined position.

6. An image capturing module for increasing assembly flatness and shortening focusing time, comprising:

an image sensing unit including a carrier substrate and an image sensing chip disposed on the carrier substrate and electrically connected to the carrier substrate, wherein the image sensing chip has a first horizontal top surface on the top side thereof, wherein the first horizontal top surface is obtained by a horizontal corrections system using a laser light source;

a housing frame disposed on the carrier substrate to surround the image sensing chip;

an actuator structure disposed on the housing frame and above the image sensing chip, wherein the actuator structure includes a lens holder disposed on the housing frame and a movable lens assembly movably disposed inside the lens holder and above the image sensing chip, and the movable lens assembly has a first plane on the top side thereof; and a reflecting material movably and temporarily placed on the first plane of the movable lens assembly, wherein the reflecting material has a second horizontal top surface on the top side thereof, the reflecting material has a second plane on the bottom side thereof and corresponding to the first plane, and the second plane is horizontal to the second horizontal top surface;

wherein the first horizontal top surface of the image sensing chip and the second horizontal top surface of the reflecting material are horizontal to each other, for increasing the assembly flatness of the movable lens assembly relative to the image sensing chip;

wherein the distance from the laser light source to the first horizontal top surface of the image sensing chip is defined as a first vertical distance, the distance from the laser light source to the second horizontal top surface of the reflecting material is defined as a second vertical distance, and a predetermined fixed focusing distance from the second horizontal top surface of the reflecting material to the first horizontal top surface of the image sensing chip is obtained by subtracting the second vertical distance from the first vertical distance, for shortening the focusing time of the movable lens assembly relative to the image sensing chip.

7. The image capturing module of claim 6, wherein the reflecting material has a first predetermined thickness, the movable lens assembly has a second predetermined thickness, the distance from the first plane of the movable lens assembly to the first horizontal top surface of the image sensing chip is defined as a third vertical distance, the distance from the bottom side of the movable lens assembly to the first horizontal top surface of the image sensing chip is defined as a fourth vertical distance, and both the third vertical distance and the first predetermined distance or all of the fourth vertical distance, the first predetermined distance and the second predetermined distance add up to around the predetermined fixed focusing distance.

8. A method of assembling an image capturing module for increasing assembly flatness and shortening focusing time, comprising:

providing an image sensing unit and a housing frame, wherein the image sensing unit includes a carrier substrate and an image sensing chip disposed on the carrier substrate and electrically connected to the carrier substrate, and the housing frame is disposed on the carrier substrate to surround the image sensing chip;

obtaining a first horizontal top surface on the top side of the image sensing chip by a horizontal correction system using a laser light source, wherein the distance from the laser light source to the first horizontal top surface of the image sensing chip is defined as a first vertical distance;

providing an actuator structure disposed on the housing frame and above the image sensing chip, wherein the actuator structure includes a lens holder disposed on the housing frame and a movable lens assembly disposed inside the lens holder and above the image sensing chip, and the lens holder includes a surrounding movable member movably disposed therein;

temporarily placing a reflecting material on the top side of the movable lens assembly;

obtaining a second horizontal top surface on the top side of the reflecting material by the horizontal correction system using the laser light source, wherein the distance from the laser light source to the second horizontal top surface of the reflecting material is defined as a second vertical distance, and the first horizontal top surface of the image sensing chip and the second horizontal top surface of the reflecting material are horizontal to each other, for increasing the assembly flatness of the movable lens assembly relative to the image sensing chip;

adjusting the focal length of the movable lens assembly relative to the first horizontal top surface of the image sensing chip, so as to move the reflecting material upwardly and downwardly until the distance from the laser light source to the second horizontal top surface of the reflecting material is substantially equal to a preset value that is defined as the second vertical distance, wherein a predetermined fixed focusing distance from the second horizontal top surface of the reflecting material to the first horizontal top surface of the image sensing chip is obtained by subtracting the second vertical distance from the first vertical distance, for shortening the focusing time of the movable lens assembly relative to the image sensing chip;

fixing the movable lens assembly inside the surrounding movable member through at least two separate bonding glue, wherein the movable lens assembly is movably disposed inside the lens holder through the surrounding movable member; and removing the reflecting material from the top side of the movable lens assembly.

9. The method of claim 8, wherein the laser light source is disposed on a predetermined position above the image sensing chip to generate a first laser light beam that is directly projected onto the first horizontal top surface of the image sensing chip, and the first laser light beam generated by the laser light source is reflected by the first horizontal top surface of the image sensing chip to form a first reflecting light beam that is directly projected onto the predetermined position or very close to the predetermined position.

10. The method of claim 8, wherein the laser light source is disposed on a predetermined position above the reflecting material to generate a second laser light beam that is directly projected onto the second horizontal top surface of the reflecting material, and the second laser light beam generated by the laser light source is reflected by the second horizontal top surface of the reflecting material to form a second reflecting light beam that is directly projected onto the predetermined position or very close to the predetermined position.

* * * * *